Sept. 20, 1966    G. N. ANAGNOSTOU    3,273,284
PLANTING CONTAINER
Filed Oct. 28, 1963    2 Sheets-Sheet 2
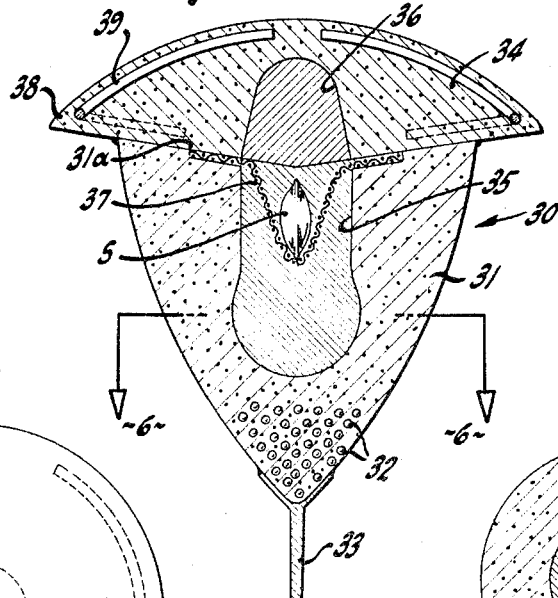
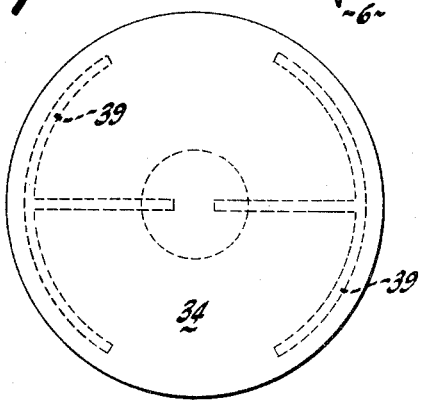
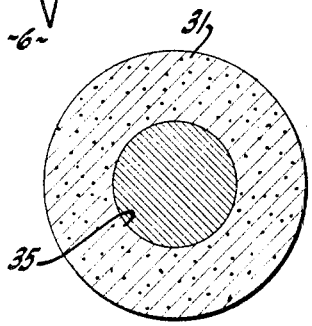
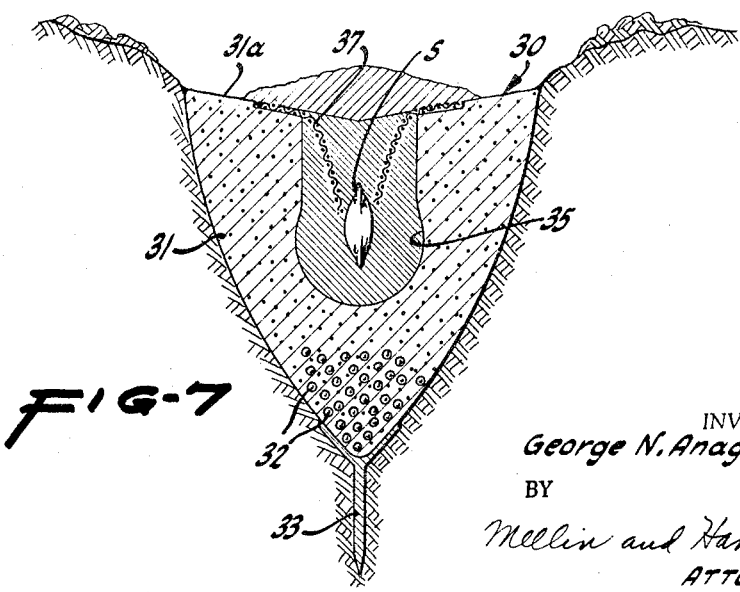
INVENTOR.
George N. Anagnostou
BY
Mellin and Hanscom
ATTORNEYS

# United States Patent Office 3,273,284
Patented Sept. 20, 1966

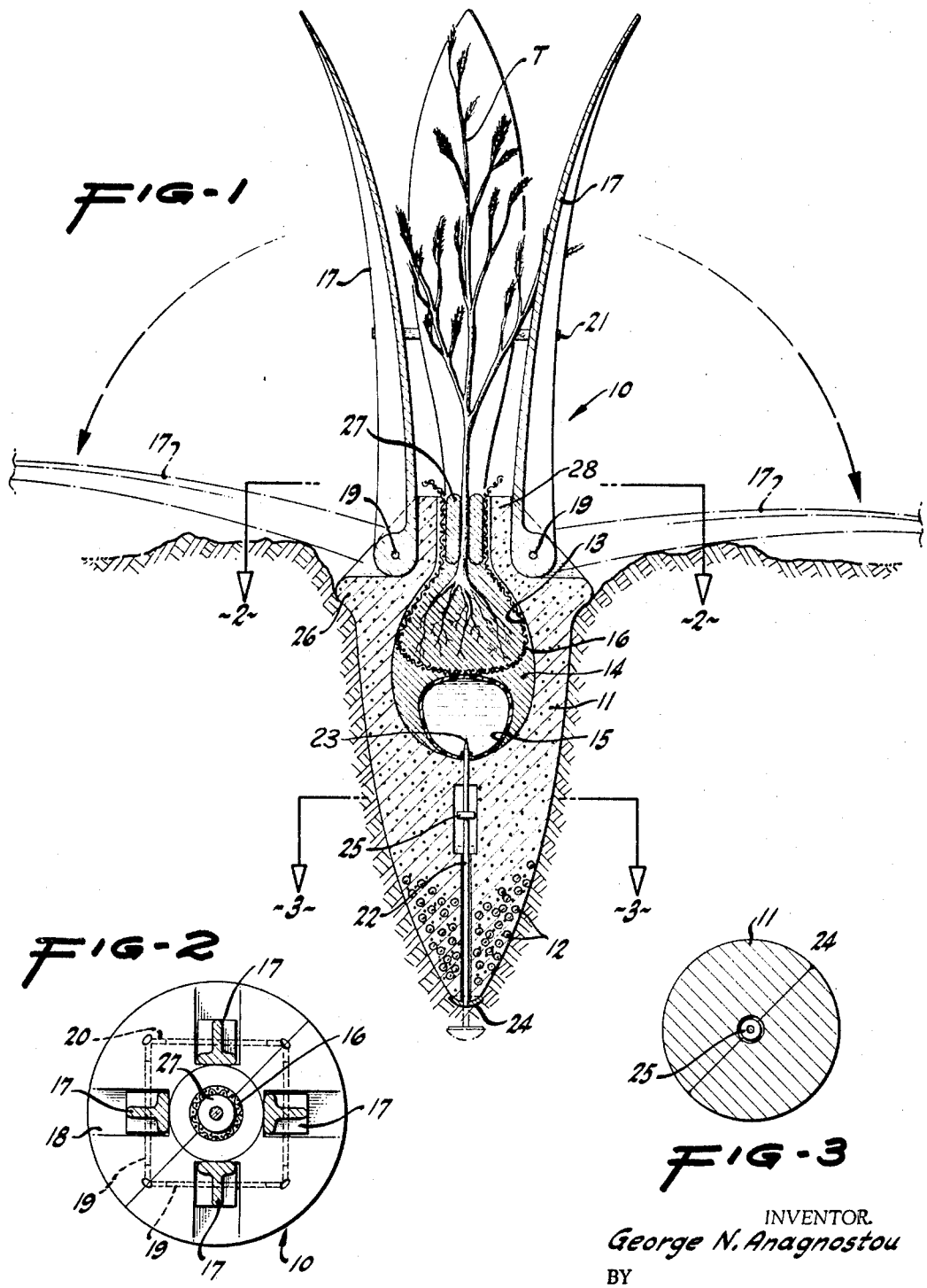

3,273,284
PLANTING CONTAINER
George N. Anagnostou, 203 Missouri St.,
San Francisco, Calif.
Filed Oct. 28, 1963, Ser. No. 319,345
12 Claims. (Cl. 47—34)

This invention relates to articles of manufacture for planting tree seedlings and seeds by means of an aerial drop, and it is of particular utility in connection with a program of reforestation.

In brief, the invention involves novel forms of containers for holding small trees and seeds and protecting them as their containers are used to penetrate the surface of the ground. The containers are constructed not only to protect the trees and seeds, but also: provide nutrients to enhance growth; provide means for controlling depth of planting; provide ballast to maintain vertical alignment of the device during an air drop; and provide a water-filled membrane that will cushion the root system of a tree seedling and supplement its natural water supply.

It is recognized that various types of containers have been manufactured from pulp and fertilizers, and are put in the ground with the plants which they hold. Exemplary teachings of this kind are described in United States Patents Nos. 2,858,647, 1,880,136 and 1,424,829. However, none of those patents, and no teaching of which applicant is aware, suggests a container that may be used in an airborne delivery and planting. Therefore, it is a primary object of this invention to provide an essentially enclosed container for seedling trees and the like, allowing them to be planted by means of an air drop. A planting container of this type permits a much faster rate of planting than ever before possible, and in areas which are relatively inaccessible and/or difficult to reseed by hand.

Another object is to provide a planting container of the type described comprising an outer shell shaped with a tapered lower end and made of material that disintegrates upon exposure to water.

Another object is to provide a planting container of the type described, including pivoted vanes that protect the limbs of a tree during an air drop and may be constructed from fertilizer materials to enrich the soil.

It is another object to provide a planting container of the type described which has iron pellets disposed in the bottom end thereof and embedded in the material of which the container is formed. This structure insures proper alignment of the container during ground-impact while also providing enrichment of the soil.

A further object of the invention is to provide a container for planting seeds by way of an air-borne drop, said container having a frangible support screen for the seed, said screen allowing the seed to be cushioned in loam as the container makes impact with the ground and positioning the seed in the center portion of a loam cavity.

Other objects of the invention will become apparent to those skilled in the art, particularly in view of the following detailed description.

In the drawings forming a part of this application and in which like parts are identified by like reference numerals throughout the same, FIG. 1 is a vertical section of a container for planting a tree seedling by means of air air drop, said container being constructed in a preferred manner contemplated by this invention and shown embedded in the ground;

FIG. 2 is a horizontal section taken on lines 2—2 of FIG. 1;

FIG. 3 is a section taken on lines 3—3 of FIG. 1;

FIG. 4 is a vertical section of a second embodiment of the invention in a container for planting seeds by means of an air-borne delivery;

FIG. 5 is a top plan view of the container shown in FIG. 4;

FIG. 6 is a section taken on lines 6—6 of FIG. 4; and

FIG. 7 is a vertical section of the seed container after impact with the ground.

Referring to FIG. 1, there is shown a container 10 made in accordance with the teaching of this invention and which may be used for planting tree seedlings. Container 10 comprises an elongated receptacle 11 made of material which disintegrates upon exposure to water. It is particularly contemplated that such material may be made in part from fertilizers and pulp, the lower end of the receptacle being weighted with iron pellets 12 embedded in the material.

Receptacle 11 is essentially enclosed, having a tapered lower end and an upper end formed with a conical riser that provides a stem passageway that opens into an inner pocket 13. The pocket, of course, receives the rooting system of seedling tree T, additional loam 14 and a water-filled membrane 15. A wire mesh 16 is employed to cradle the rooting system of the tree in the rooting soil in which the rooting system was first grown. Thus, it is unnecessary to expose the rooting system while transferring the seedling to the receptacle 11. Wire mesh 16 has other purposes which will be discussed in connection with implanting the container by an air drop operation.

A number of vanes 17 are pivotally supported from the top end of receptacle 11. More particulaly, the lower end of each vane is received in a slot 18 of the riser and each is pinned thereto by wire nails 19 which are fitted into bore holes 20 formed through the riser. Vanes 17 are held in the position shown in FIG. 1 by a frangible collar 21 that is placed around the vanes, and an engagement between the back surfaces of slots 18 and respective vanes 17 restricts movement of the vanes in the direction towards the limbs of tree T. Collar 21 may be made of ordinary string or of paper band.

Container 10 is further provided with a coaxial pin member 22 for puncturing membrane 15 as the container impacts against the ground. The puncturing end 23 of pin 22 is preferably pointed, while the exposed outer end 24 is rounded off to form a comparatively blunt contact surface. Pin 22 is held within receptacle 11 by a spring collar 25, which may be wedged over the pointed end 23 and engaged with a notch formed on the pin.

Referring again to FIG. 1, it will be seen that receptacle 11 is formed with a flange 26 near its upper end. This flange serves to locate the receptacle relative to ground level, since it will have a decided braking effect when the receptacle penetrates the ground to a depth which places the flange into contact with the ground.

Receptacle 10 may best be made in two halves or parts, as shown in FIGS. 2 and 3. These parts are then glued together after the roots of the tree have been balled in screen 16 and inserted, together with loam 14 and water-filled membrane 15, into pocket 13. In addition, it is preferable to provide a cushion membrane 27, such as a sponge, within riser 28, said membrane being wrapped around the stem of the tree.

The above described container may be dropped from varying heights, although rather low altitudes are contemplated. Moreover, since the speed of the aircraft which drops the devices must be comparatively slow, the use of helicopters is preferred. Moreover, the time or season of year during which the devices are used should coincide with seasonal rains. This is important not only to initiate a disintegration of the container but also to insure that the devices are dropped when the ground can be easily pierced.

It will be evident, that during a free fall of the container, pellets 12 and vanes 17 will align the container vertically relative to the ground in an upright position.

Vanes 17 also protect the upper end of the tree from wind damage and also from brush, which may be encountered shortly before the container makes impact with the ground. Upon impact, needle 22 pierces membrane 15, allowing the water contained therein to flow downwardly and out. Simultaneously, the rooting system of the tree, which is enveloped in loam contained within the wire mesh 16, will push downwardly until the wire fractures, said rooting system being cushioned by membrane 15 and the water reservoir therebelow. The rooting system will eventually come to rest in the center of pocket 13.

The momentum of vane 17 at the time of the container's impact will cause each vane to pivot about its hinge pin 19 and into the broken line position illustrated in FIG. 1. This movement of the vanes exposes the limbs of the tree while simultaneously knocking over any grasses or brush in that immediate area.

Vane 17, like receptacle 11, may also be made of a disintegrating material and preferably of fertilizers. In fact, the vanes may be of weaker construction than the container so that they break up at the time of impact and their fragments distributed over the surface of the ground. This will provide a more widespread fertilization.

FIGS. 4–7 illustrate a second embodiment of the invention and, more particularly, related to a container for planting seeds. Similar to the container of FIGS. 1–3, seed container 30 comprises an elongated seed receptacle 31 that is also formed of water-disintegrating material. Iron pellets 32 are used as ballast in the lower end of the container to control its angle of descent and impact.

A needle nosepiece 33 is mounted to the tapered lower end of the container, as by means of glue, and the upper end of receptacle 31 is covered by a detachable cap 34. Both seed receptacle 31 and cap 34 are formed with pockets 35 and 36, respectively, said pockets being complementary to each other and filled with loam. A seed S is supported within pocket 35 upon a frangible support screen 37 having edges wedged between surfaces of the receptacle and cap. At the time of assembly, screen 37 serves to position the seed within the pocket 35.

It is particularly desirable to form receptacle 31 with a concave upper end or surface 31a. So constructed, the receptacle tends to collect water and funnel the water toward the seed. The shape of surface 31a also serves as a catch basin for receiving the soil from the cap, and upon impact the soil will be placed over the seed S.

It will be especially noted that cap 34 is formed with peripheral edges that extend laterally outward from the sides of receptacle 31. More particularly, the peripheral edges 38 of cap 34 overlie or extend beyond the lower portion of receptacle 31 and make contact with the ground to resist if not stop further movement of the container. Moreover, as the peripheral edges 38 come into contact with the ground, they will separate cap 34 from seed receptacle 31 and, depending upon the nature of manufacturing cap 34, it may either by detached as a unitary assembly or broken up into fragments. The latter type of construction is preferred, and if made of fertilizer materials the cap fragments will serve to enrich the surface area around the planted seed. To effect a disintegration of the cap and also to separate the cap from seed container 31, wire members 39 may be embedded therein during its manufacture.

The manner of using seed container 30 may be the same as that employed with container 10. However, the greater strength of a seed (in the absence of a rooting system and a stem end) permits the device to be dropped from greater heights. It also allows the device to be used in harder terrain with reasonable assurance that the planting will be effective and that the seed will germinate.

Although preferred embodiments of this invention have been illustrated and described, it is to be understood that the size of the containers is determined largely by the rooting requirements of a seedling tree and upon the size of a given seed. Moreover, it will be evident that various changes may be made without departing from the spirit of the invention or the scope of the attached claims, and each of such changes is contemplated.

What I claim and desire to secure by Letters Patent is:

1. A planting container comprising an essentially enclosed receptacle having an elongated shape and a tapered lower end, said receptacle having an internal pocket filled with loam and being formed of material that disintegrates upon exposure to water, the upper end of said receptacle supporting a set of protective vanes spaced around a stem opening extending into said pocket, each vane being pivotally mounted to said receptacle, the lower end of said receptacle being weighted with metal embedded therein and frangible means encircling said protective vanes to hold them in protective relationship to the limbs of a tree having roots planted in said receptacle pocket.

2. The container of claim 1 and further including a protective membrane mounted within the stem opening and encircled around the stem of the tree.

3. The container of claim 1 wherein the upper end of said receptacle is formed with stop means for restricting pivotal movement of said vanes to prevent damage to the limbs of the tree.

4. The container of claim 1 wherein said vanes are formed of a disintegrating fertilizer material.

5. The container of claim 1 and further including a water-filled membrane disposed in the loam pocket subjacent the roots of a planted tree, a pin extending through the lower end of said receptacle and positioned for rupturing said water-filled membrane as the receptacle strikes the ground.

6. A planting container comprising a lower seed receptacle and a cap plate, said receptacle having an elongated shape tapered downwardly and an internal pocket filled with loam, the lower end of said receptacle being weighted with metal embedded therein, said receptacle being formed of material that disintegrates upon exposure to water, said cap plate having an internal pocket filled with loam disposed above the pocket of said receptacle and a peripheral edge extending outward from the upper end of said receptacle.

7. The planting container of claim 6 wherein the upper end of said seed receptacle is formed with a dished surface.

8. The planting container of claim 6 and further including a frangible seed support extending across the pocket of said receptacle.

9. The planting container of claim 6 wherein said metal comprises iron pellets embedded in the lower end of said seed receptacle.

10. A planting container comprising an essentially enclosed receptacle having an elongated shape and a tapered lower end, said receptacle having an internal pocket filled with loam and being formed of material that disintegrates upon exposure to water, the lower end of said receptacle being weighted with metal embedded in said material, a set of protective vanes spaced around a stem opening in said receptacle at the upper end thereof and pivotally mounted thereto, and a frangible collar encircling said protective vanes and holding them into protective relationship relative to the limbs of a tree.

11. A planting container comprising an essentially enclosed receptacle having an elongated shape and a tapered lower end, said receptacle being formed with a riser defining an upper stem opening, said receptacle having an internal pocket filled with loam and being formed of material that disintegrates upon exposure to water, the lower end of said receptacle being weighted with metal embedded in said material, a set of protective vanes spaced around said riser and pivotally mounted to said receptacle, and a frangible collar encircling said protective vanes to hold them in protective relationship to the limbs of a tree planted in said receptacle, said riser restricting movement of said vanes to prevent damage to the limbs of the tree.

12. A planting container comprising an essentially enclosed receptacle having an elongated shape and a tapered lower end, said receptacle having an internal pocket filled with loam and being formed of materials that disintegrates upon exposure to water, the lower end of said receptacle being weighted with metal embedded in said material, the upper end of said receptacle being covered by a detachable cap, said cap having peripheral edges extending beyond the upper periphery of said receptacle.

References Cited by the Examiner

UNITED STATES PATENTS

| 1,880,136 | 9/1932 | Hickok | 47—37 |
| 2,757,841 | 8/1956 | Chapman | 47—37 |
| 2,785,969 | 3/1957 | Clawson. | |

ABRAHAM G. STONE, *Primary Examiner.*

R. E. BAGWILL, *Assistant Examiner.*